US012019391B2

(12) United States Patent
Kamiya et al.

(10) Patent No.: US 12,019,391 B2
(45) Date of Patent: Jun. 25, 2024

(54) IMAGE FORMING APPARATUS INCLUDING COVER, ADJUSTMENT MECHANISM, AND LINK MECHANISM CONNECTED TO BOTH COVER AND ADJUSTMENT MECHANISM

(71) Applicant: BROTHER KOGYO KABUSHIKI KAISHA, Nagoya (JP)

(72) Inventors: Masataka Kamiya, Owariasahi (JP); Tomonori Watanabe, Ichinomiya (JP); Saya Minoshima, Gifu (JP); Tetsuya Morita, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/152,835

(22) Filed: Jan. 11, 2023

(65) Prior Publication Data

US 2023/0236538 A1 Jul. 27, 2023

(30) Foreign Application Priority Data

Jan. 13, 2022 (JP) ................................ 2022-003940

(51) Int. Cl.
*G03G 21/16* (2006.01)
*G03G 15/20* (2006.01)

(52) U.S. Cl.
CPC ..... *G03G 21/1647* (2013.01); *G03G 15/2032* (2013.01); *G03G 15/2064* (2013.01);
(Continued)

(58) Field of Classification Search
CPC ........... G03G 21/1647; G03G 15/2064; G03G 21/1685; G03G 21/1633; G03G 15/2035;
(Continued)

(56) References Cited

U.S. PATENT DOCUMENTS 7,515,850 B2 * 4/2009 Hasegawa .......... G03G 21/1638 399/328
8,190,060 B2 * 5/2012 Yoshinaga ......... G03G 15/2032 399/329

(Continued)

FOREIGN PATENT DOCUMENTS

JP 2000-66547 A 3/2000
JP 2002-148992 A 5/2002

(Continued)

*Primary Examiner* — Arlene Heredia
*Assistant Examiner* — Laura Roth
(74) *Attorney, Agent, or Firm* — Merchant & Gould P.C.

(57) ABSTRACT

An image forming apparatus includes: a frame; a cover movable between a closed position and an open position; a fixing unit including a heating member and a pressure roller configured to form a nipping region therebetween; an adjustment mechanism configured to adjust a nipping pressure between the heating member and the pressure roller in conjunction with movement of the cover; and a link mechanism connected to both the adjustment mechanism and the cover. The adjustment mechanism includes an arm pressing the heating member such that the heating member and the pressure roller form the nipping region. The link mechanism includes: a first link connected to the cover; a second link connected to the first link and pivotally movable about an axis extending in a width direction; and a third link connected to both the second link and the adjustment mechanism. The third link is movable in a front-rear direction.

10 Claims, 13 Drawing Sheets

(52) U.S. Cl.
CPC ..... *G03G 21/1633* (2013.01); *G03G 21/1685* (2013.01); *G03G 21/1638* (2013.01); *G03G 2215/00544* (2013.01); *G03G 2215/2035* (2013.01); *G03G 2221/169* (2013.01)

(58) Field of Classification Search
CPC ..... G03G 21/1638; G03G 2215/00544; G03G 2215/00548; G03G 2221/1675; G03G 2221/169; G03G 15/2032; G03G 15/6573
See application file for complete search history.

(56) References Cited

U.S. PATENT DOCUMENTS

| | | | | |
|---|---|---|---|---|
| 10,310,421 | B1 * | 6/2019 | Buchanan | G03G 15/2028 |
| 10,901,348 | B1 * | 1/2021 | Buchanan | G03G 21/1633 |
| 2006/0062620 | A1 * | 3/2006 | Tanjo | G03G 15/231<br>399/401 |
| 2006/0216060 | A1 * | 9/2006 | Kuwata | G03G 15/234<br>399/110 |
| 2010/0254728 | A1 * | 10/2010 | Iwase | G03G 15/2035<br>399/122 |
| 2012/0082478 | A1 | 4/2012 | Wang | |
| 2017/0185001 | A1 | 6/2017 | Itabashi et al. | |
| 2018/0107149 | A1 * | 4/2018 | Takahashi | G03G 21/1633 |
| 2021/0311411 | A1 | 10/2021 | Kusuda et al. | |

FOREIGN PATENT DOCUMENTS

| | | | |
|---|---|---|---|
| JP | 2006195270 | A * | 7/2006 |
| JP | 2012-93700 | A | 5/2012 |

* cited by examiner

IMAGE FORMING APPARATUS INCLUDING COVER, ADJUSTMENT MECHANISM, AND LINK MECHANISM CONNECTED TO BOTH COVER AND ADJUSTMENT MECHANISM

REFERENCE TO RELATED APPLICATIONS

This application claims priority from Japanese Patent Application No. 2022-003940 filed on Jan. 13, 2022. The entire content of the priority application is incorporated herein by reference.

BACKGROUND ART

There has been known a conventional image forming apparatus including a fixing unit, such as a laser printer and the like. In this conventional image forming apparatus, a nip between a heating member and a pressure member in the fixing unit needs to be released when performing a jam process. To this end, the conventional image forming apparatus includes a link mechanism for making and releasing a nipping region formed by a pressure roller (the pressure member) and a heating roller (the heating member) in conjunction with an opening and closing of a top cover.

The link mechanism in the conventional image forming apparatus includes a nip release member connected to the pressure roller, and a connecting rod connecting the nip release member and the top cover to each other. When the top cover is opened, the top cover raises the connecting rod while pivotally moving the same, whereby the connecting rod raises the nip release member to release the nipping region formed by the pressure roller relative to the heating roller. Conversely, when the top cover is closed, the top cover lowers the connecting rod while pivotally moving the same to lower the nip release member, thereby causing the pressure roller to form the nipping region in cooperation with the heating roller.

DESCRIPTION

According to the structure of the conventional image forming apparatus, the connecting rod moves mainly in the up-down direction during opening and closing of the top cover. This structure requires a space in the image forming apparatus along the up-down direction to allow the movement of the connecting rod, which leads to increasing in size of the image forming apparatus.

In view of the foregoing, it is an object of the present disclosure to provide an image forming apparatus including a link mechanism for making and releasing a nipping region in a fixing unit in conjunction with opening and closing of a cover and capable of reducing the amount of movement in an up-down direction of the link mechanism.

In order to attain the above and other object, the present disclosure provides an image forming apparatus including: a frame; a cover; a fixing unit; an adjustment mechanism; and a link mechanism. The frame has one end portion in a front-rear direction. The frame is formed with an opening at the one end portion. The cover is supported by the one end portion so as to be pivotally movable between: a closed position in which the cover covers the opening; and an open position in which the cover opens the opening to an outside. The fixing unit is configured to thermally fix an image to a sheet. The fixing unit includes: a heating member; and a pressure roller. The heating member is positioned closer to the one end portion than a center in the front-rear direction of the frame is to the one end portion. The heating member is configured to heat the sheet having an image formed thereon. The pressure roller is configured to form a nipping region in cooperation with the heating member. The adjustment mechanism is configured to adjust a nipping pressure between the heating member and the pressure roller in conjunction with movement of the cover between the closed position and the open position. The adjustment mechanism includes an arm pressing the heating member such that the heating member and the pressure roller form the nipping region therebetween. The arm is positioned at a first position when the cover is in the open position. The arm is positioned at a second position when the cover is in the closed position. The arm in the second position causes the nipping pressure to be reduced to a pressure lower than the nipping pressure when the arm is in the first position. The link mechanism is connected to both the adjustment mechanism and the cover. The link mechanism includes: a first link; a second link; and a third link. The first link is connected to the cover. The second link is connected to the first link and supported by the frame so as to be pivotally movable about a first axis extending in a width direction orthogonal to the front-rear direction. The third link is connected to both the second link and the adjustment mechanism. The third link is movable in the front-rear direction.

In the above structure, with the link mechanism and the adjustment mechanism, the fixing unit is switchable between a state of being ready for printing and a state of being ready for a jam process in conjunction with opening and closing of the cover. Further, according to the link mechanism, the amount of pivotal movement of the second link is converted into the amount of movement of the third link in the front-rear direction since the second link is a pivot link. Hence, the amount of movement in the up-down direction of the link mechanism can be reduced. This structure allows the image forming apparatus to be made more compact in the dimension in the up-down direction. Furthermore, since the cover and the heating member are positioned together in the vicinity of the one end portion in the image forming apparatus, the link mechanism positioned between the cover and the fixing unit can be made compact.

OVERALL STRUCTURE OF IMAGE FORMING APPARATUS

Figure 1:
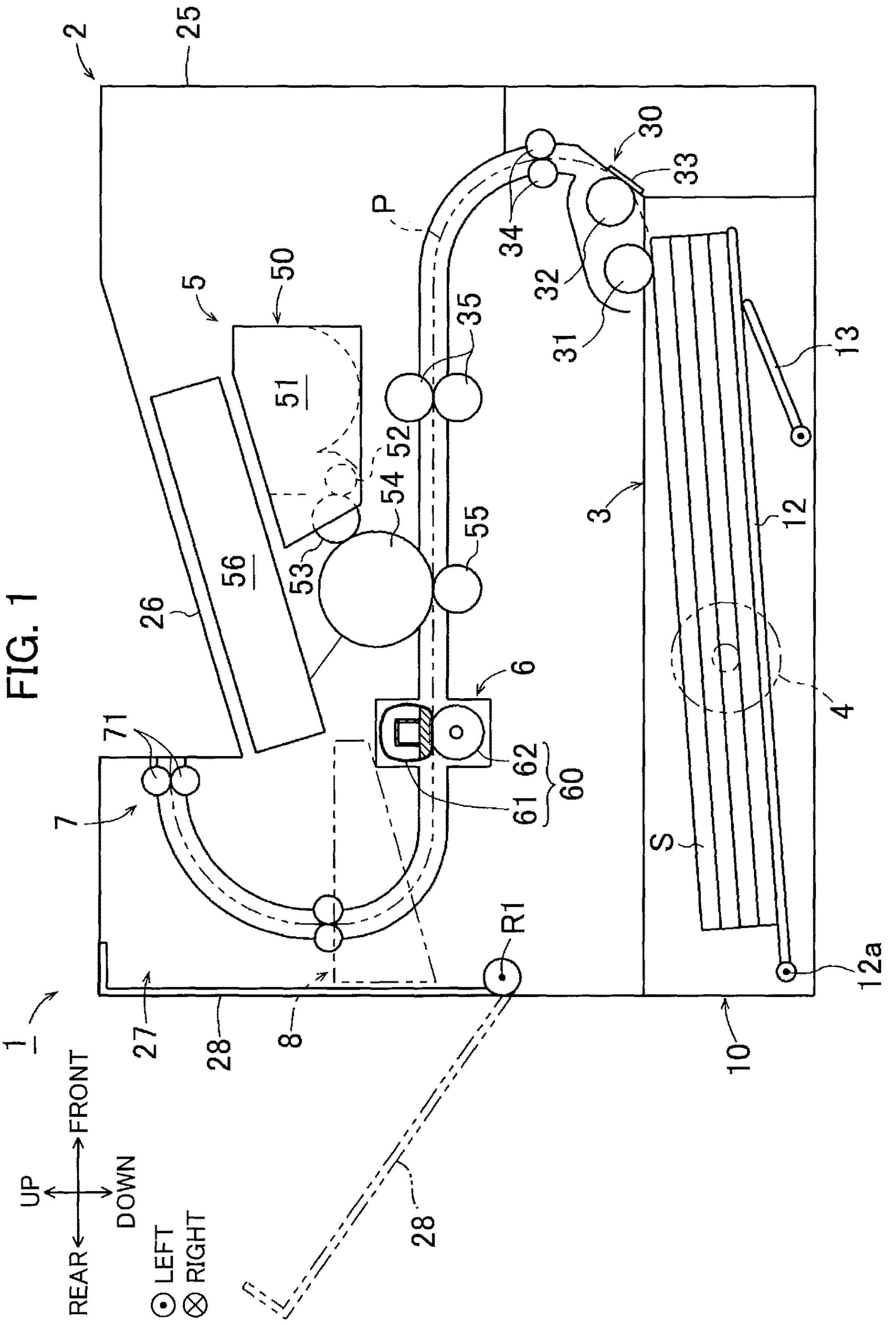
FIG. 1 is a central cross-sectional view of an image forming apparatus.

Hereinafter, one embodiment of the present disclosure will be described while referring to the accompanying drawings. An image forming apparatus 1 illustrated in FIG. 1 is an example of the image forming apparatus according to the embodiment. The image forming apparatus 1 is a laser printer configured to form an image(s) on a sheet(s) S according to an electrophotographic method.

In the following description, the right side in FIG. 1 will be defined as the front side of the image forming apparatus 1 while the left side in FIG. 1 will be defined as the rear side of the image forming apparatus 1. The near side in FIG. 1 will be defined as the left side of the image forming apparatus 1 while the far side in FIG. 1 will be defined as the right side of the image forming apparatus 1. Further, the upper side in FIG. 1 will be defined as the upper side of the image forming apparatus 1 while the lower side in FIG. 1 will be defined as the lower side of the image forming apparatus 1.

The image forming apparatus 1 includes a housing 2, a supply unit 3, a motor 4, an image forming unit 5, a fixing device 6, and a discharge unit 7.

The housing 2 includes a frame 21 (see FIG. 6) supporting each member, and a cover 25 covering the frame 21 and constituting the external appearance of the image forming apparatus 1. The frame 21 includes a left frame (not illustrated) constituting the left portion of the frame 21, a right frame 22 (see FIG. 6) constituting the right portion of the frame 21, and a plurality of connection frames (not illustrated) connecting the left frame and the right frame 22 to each other. The cover 25 includes a discharge tray 26 formed at the upper surface of the cover 25, and has an opening 27 formed at the rear surface of the cover 25. The cover 25 also includes a rear cover 28 configured to cover the opening 27. The rear cover 28 is an example of the cover.

The rear cover 28 is supported by the left frame and the right frame 22 so as to be pivotally movable about a pivot axis R1. The pivot axis R1 is positioned at the lower end portion of the opening 27 and extends in a left-right direction. The left-right direction is an example of the width direction. Accordingly, the rear cover 28 is movable between a closed position (the position indicated by the solid line in FIG. 1) in which the rear cover 28 covers the opening 27 and an open position (the position indicated by two-dotted chain line in FIG. 1) in which the rear cover 28 opens the opening 27 to the outside. In a state where the rear cover 28 is in the open position, the sheet S jammed in either the fixing device 6 or the discharge unit 7 can be removed through the opening 27, i.e., a so-called jam process can be performed.

The supply unit 3 includes a sheet tray 10 configured to support the sheet S, a sheet conveying unit 30, a pair of conveying rollers 34, and a pair of registration rollers 35. The supply unit 3 is positioned at the lower portion of the housing 2. The supply unit 3 is configured to convey the sheet S supported on the sheet tray 10 to the image forming unit 5. The image forming apparatus 1 has a conveying passage P of the sheet S from the supply unit 3 to the discharge unit 7 via the image forming unit 5.

The sheet tray 10 includes a lifter plate 12, and a pressure plate 13. The lifter plate 12 is a plate-like member for supporting the sheet S from below. The lifter plate 12 is pivotally movable about a pivot axis 12*a* positioned at the rear end portion of the lifter plate 12. The lifter plate 12 is liftable and lowerable between a lifted position and a lowered position by pivotal movement thereof about the pivot axis 12*a*. The pressure plate 13 is positioned below the lifter plate 12 and is configured to lift and lower the lifter plate 12 between the lifted position and the lowered position.

The sheet conveying unit 30 is a conveying mechanism configured to pick up and separate the sheets S supported on the sheet tray 10 and to convey one sheet at a time toward the image forming unit 5. The sheet conveying unit 30 includes a feed roller 31, a separation roller 32, and a separation pad 33.

The feed roller 31 is a roller for feeding the sheets S supported on the sheet tray 10 toward the separation roller 32. The separation roller 32 is positioned downstream of the feed roller 31 in a sheet conveying direction. The separation pad 33 is disposed so as to face the separation roller 32 and is urged toward the separation roller 32.

The sheets S fed toward the separation roller 32 by the feed roller 31 are separated at a portion between the separation roller 32 and the separation pad 33 and fed to the conveying passage P one by one.

The sheet S fed to the conveying passage P is conveyed toward the image forming unit 5 by the pair of the conveying rollers 34 and the pair of the registration rollers 35. The pair of the registration rollers 35 is configured to regulate and temporarily stop movement of the leading end of the sheet S being conveyed and then to convey the sheet S toward the image forming unit 5 at a prescribed timing.

The image forming unit 5 is positioned downstream of the supply unit 3 in the sheet conveying direction. The image forming unit 5 is configured to form an image on the sheet S conveyed from the supply unit 3. The image forming unit 5 includes a process cartridge 50, and an exposure unit 56. The process cartridge 50 is configured to transfer an image onto a surface of the sheet S conveyed from the supply unit 3. The exposure unit 56 is configured to expose a surface of a photosensitive drum 54 (described later) in the process cartridge 50 to light.

The process cartridge 50 is positioned above the supply unit 3 in the housing 2. The process cartridge 50 includes a developing agent accommodation chamber 51, a supply roller 52, a developing roller 53, the photosensitive drum 54, and a transfer roller 55.

The exposure unit 56 includes a laser diode, a polygon mirror, lenses, reflection mirrors, and other components. The exposure unit 56 is configured to expose the surface of the photosensitive drum 54 to light by emitting laser beam toward the photosensitive drum 54 on the basis of image data inputted to the image forming apparatus 1.

The developing agent accommodation chamber 51 accommodates therein toner as the developing agent. The toner accommodated in the developing agent accommodation chamber 51 is sent to the supply roller 52 while being agitated by an agitator (not illustrated). The supply roller 52 is configured to supply to the developing roller 53 the toner sent from the developing agent accommodation chamber 51.

The developing roller 53 is disposed in intimate contact with the supply roller 52. The developing roller 53 is configured to carry thereon toner supplied from the supply roller 52 and positively charged by a friction member (not illustrated). Further, the developing roller 53 is applied with a developing bias by a bias application means (not illustrated).

The photosensitive drum 54 is disposed adjacent to the developing roller 53. The surface of the photosensitive drum 54 is uniformly charged by a charger (not illustrated), and then is exposed to light by the exposure unit 56. The exposed region of the surface of the photosensitive drum 54 has a potential lower than that of the other region (the non-exposed regions) thereof, whereby an electrostatic latent image based on the image data is formed on the surface of the photosensitive drum 54. After that, positively charged toner is supplied from the developing roller 53 onto the surface of the photosensitive drum 54 having the electrostatic latent image formed thereon, so that the electrostatic latent image is developed into a toner image.

The transfer roller 55 is disposed so as to face the photosensitive drum 54. Transfer bias is applied to the transfer roller 55 by a bias application means (not illustrated). In a state where a surface of the transfer roller 55 is applied with the transfer bias, the toner image formed on the surface of the photosensitive drum 54 is transferred onto the surface of the sheet S when the sheet S is conveyed while being nipped by and between the transfer roller 55 and the photosensitive drum 54 having the toner image formed thereon. The sheet S having the toner image transferred thereon is conveyed to the fixing device 6.

The fixing device 6 includes a fixing unit 60, and is configured to thermally fix the image transferred onto the sheet S by the process cartridge 50 to the sheet S. The fixing unit 60 includes a heating unit 61, and a pressure roller 62. The heating unit 61 is heated by being supplied with electric power from a power source (not illustrated). The pressure roller 62 is disposed so as to face the heating unit 61. The heating unit 61 is urged toward the pressure roller 62, so that the heating unit 61 and the pressure roller 62 form a nipping region.

When the sheet S having the toner image transferred thereon has been conveyed to the fixing device 6, the heating unit 61 conveys the sheet S while nipping the sheet S between the heating unit 61 and the pressure roller 62 and heats the sheet S, thereby thermally fixing the toner image to the sheet S. In this way, the fixing device 6 conveys and heats the sheet S conveyed from the image forming unit 5.

The discharge unit 7 is positioned downstream of the image forming unit 5 in the sheet conveying direction, and is configured to discharge the sheet S having the image formed thereon by the image forming unit 5 onto the discharge tray 26. The discharge unit 7 includes a pair of discharge rollers 71. The pair of the discharge rollers 71 is configured to convey toward the discharge tray 26 the sheet S conveyed along the conveying passage P from the fixing device 6.

<Fixing Device>

Figure 2:
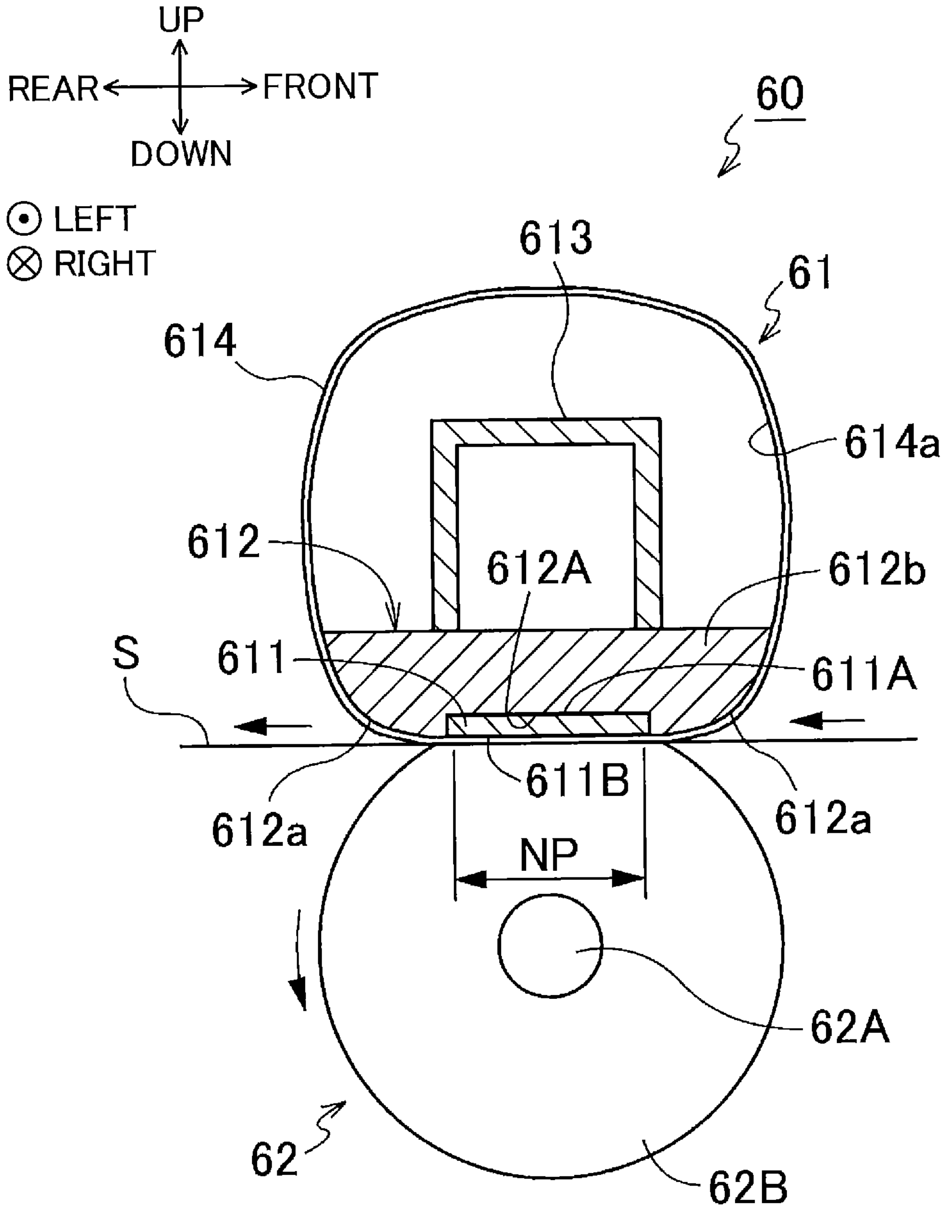
FIG. 2 is a side cross-sectional view of a fixing unit.
Figure 3:
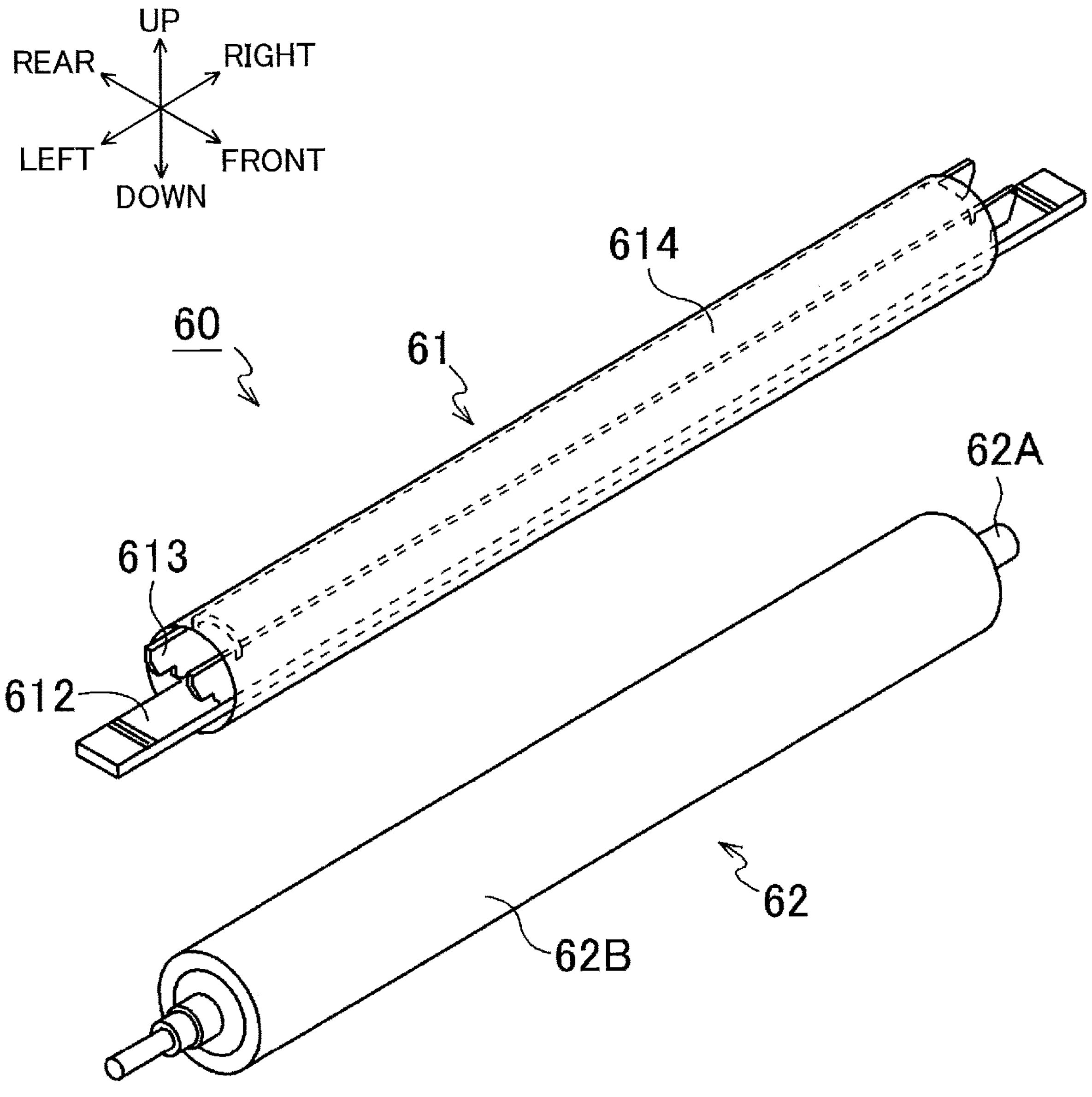
FIG. 3 is a perspective view of the fixing unit.

As illustrated in FIGS. 2 and 3, the heating unit 61 of the fixing unit 60 includes a heater 611, a holder 612, a stay 613, and a belt 614. The heater 611 has a flat plate-like shape extending in the left-right direction. The heater 611 has a first surface 611A and a second surface 611B opposite the first surface 611A. The first surface 611A is supported by the holder 612.

The holder 612 is made of a resin, for example. The holder 612 includes a support wall 612*b*. The support wall 612*b* has a guide surface 612*a*, and a supporting surface 612A. The guide surface 612*a* is in contact with an inner peripheral surface 614*a* of the belt 614 for guiding a circular movement of the belt 614. The supporting surface 612A is in contact with the first surface 611A of the heater 611 and supports the same. The stay 613 is a member supporting the holder 612 and has a rigidity higher than that of the holder 612. For example, the stay 613 is formed by bending a plate material such as a steel plate so as to have a substantially U-shaped cross section.

The belt 614 is an endless belt having heat resistivity and flexibility. The belt 614 includes a base tube made of metal such as stainless steel, and a fluorine resin layer coating the base tube. The heater 611, the holder 612, and the stay 613 are disposed inside the loop formed by the belt 614. The belt 614 is configured to circularly move around the heater 611, the holder 612, and the stay 613. The inner peripheral surface 614*a* of the belt 614 is in contact with the heater 611.

The pressure roller 62 includes a shaft 62A made of metal, and an elastic layer 62B coating the shaft 62A. The pressure roller 62 is pressed by the heater 611 through the belt 614. The pressure roller 62 and the heater 611 nip the belt 614 therebetween, whereby the pressure roller 62 and the heating unit 61 form a nipping region NP for applying heat and pressure to the sheet S.

The pressure roller 62 is configured to be driven to rotate when a driving force is transmitted to the pressure roller 62 from the motor 4. When the pressure roller 62 rotates, the belt 614 is circularly moved following the rotation of the pressure roller 62 through frictional force generated with the belt 614 or the sheet S nipped at the nipping region NP. Hence, the toner image transferred to the sheet S is thermally fixed to the sheet S by conveyance of the sheet S through the portion between the pressure roller 62 and the heated belt 614.

Figure 4:
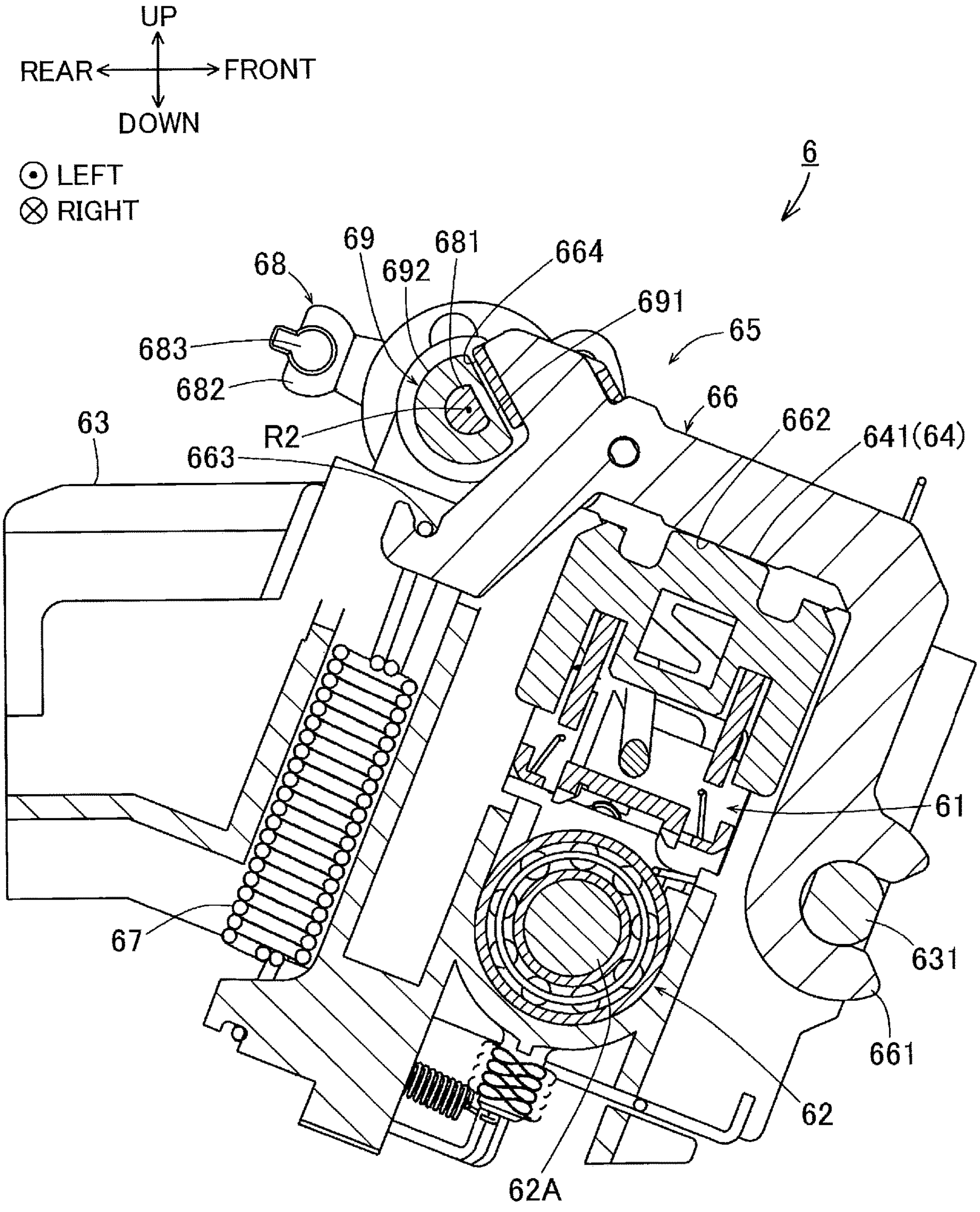
FIG. 4 is a side cross-sectional view of a fixing device, and particularly illustrating a state where arms are in their first position.
Figure 5:
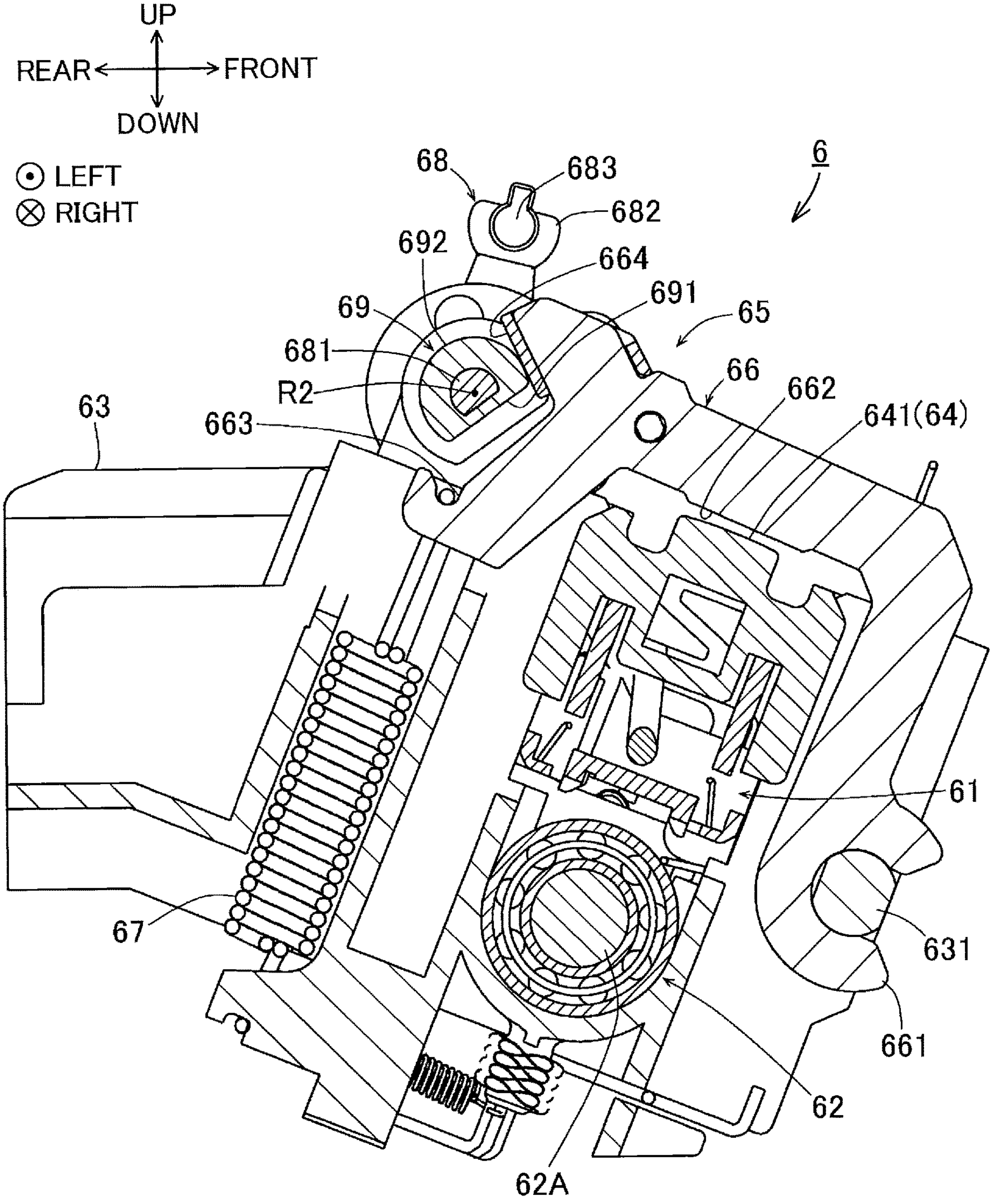
FIG. 5 is a side cross-sectional view of the fixing device, and particularly illustrating a state where the arms are in their second position.

As illustrated in FIGS. 4 and 5, the fixing device 6 further includes a fixing frame 63, a guide member 64, and an adjustment mechanism 65. The fixing frame 63 is a frame supporting each member of the fixing device 6 and is fixed to both the left frame and the right frame 22. The guide member 64 is disposed above the heating unit 61 to support the same. The guide member 64 is supported by the fixing frame 63 so as to be movable in an up-down direction. More specifically, the guide member 64 is supported so as to be movable relative to the pressure roller 62 both in a direction for forming the nipping region NP (in the downward direction in the present embodiment) and in a direction for releasing the nipping region NP (in the upward direction in the present embodiment).

The guide member 64 and the heating unit 61 are an example of the heating member configured to heat the sheet S having an image formed thereon. The guide member 64 and the heating unit 61 are positioned further rearward than the front-rear center of the frame 21 in a front-rear direction.

The adjustment mechanism 65 adjusts the nipping pressure at the nipping region NP between the heating unit 61 and the pressure roller 62. The adjustment mechanism 65 includes a pair of arms 66 (left and right arms 66), a pair of springs 67 (left and right springs 67) as an example of the urging member, a fourth link 68, and a pair of cams 69 (left and right cams 69).

Each of the arms 66 has a substantially L-shaped member made of metal. The left and right arms 66 are disposed at positions in which the left and right arms 66 can press the left and right end portions of the guide member 64, respectively. Each of the arms 66 includes an outer-fitting part 661, a pressing part 662, a supporting part 663, and a contact part 664. The outer-fitting part 661 is fitted around a corresponding one of bosses 631 of the fixing frame 63 such that the arm 661 is pivotally movable. The pressing part 662 is configured to press an upper surface 641 of the guide member 64. The supporting part 663 supports the upper end portion of the corresponding spring 67. The contact part 664 is made of resin and has a flat surface that can contact the corresponding cam 69.

Each arm 66 is movable between a first position (the position depicted in FIG. 4) and a second position (the position depicted in FIG. 5). When the arm 66 is in the first position, the pressing part 662 presses the upper surface 641 of the guide member 64 so that the pressure roller 62 and the heating unit 61 form the nipping region NP therebetween. When the arm 66 is in the second position, the pressing part 662 is separated from the upper surface 641 of the guide member 64 so that the nipping pressure at the nipping region NP is reduced to a lower pressure than that when the arm 66 is in the first position.

Reducing the nipping pressure means releasing the nipping region between the pressure roller 62 and the heating unit 61. In this state, the belt 614 may be separated from the pressure roller 62 to make the nipping region NP disappear. The toner image can be thermally fixed to the sheet S in a state where the arms 66 are in their first position, while the jam process to remove the sheet S that has been jammed can be performed in a state where the arms 66 are in their second position.

Each of the springs 67 is, for example, a tensile coil spring. The upper end portion of the spring 67 is supported by the supporting part 663 of the corresponding arm 66, while the lower end portion of the spring 67 is supported by the fixing frame 63. The spring 67 urges the corresponding arm 66 in a direction from the second position toward the first position. In place of the spring 67, an elastic member such as rubber, a solenoid, a magnet, and the like may be available as the urging member.

The fourth link 68 includes a shaft 681 extending in the left-right direction, and a link member 682 fixed to the right end portion of the shaft 681. The shaft 681 is supported by the fixing frame 63 so as to be pivotally movable about a pivot axis R2 extending in the left-right direction. The pivot axis R2 is an example of the second axis. The link member 682 is an arm-shaped member. One end portion of the link member 682 is formed with a hole (not illustrated) in which the shaft 681 is fitted while the other end portion of the link member 682 includes a boss 683 protruding leftward. The link member 682 is pivotally movable about the pivot axis R2 along with pivotal movement of the shaft 681.

The cam 69 is fixed to each end portion of the shaft 681 in the left-right direction. Each cam 69 is pivotally movable about the pivot axis R2 along with pivotal movement of the shaft 681 to guide the corresponding arm 66 to the second position. The cam 69 is made of resin and is D-shaped in cross section. The cam 69 has a first cam surface 691 configured of a flat surface, and a second cam surface 692 configured of an arcuate surface continuous with the first cam surface 691. The cam 69 can be easily manufactured by making the cross section of the cam 69 D-shaped.

The first cam surface 691 is separated from the contact part 664 of the corresponding arm 66 in a state where the first cam surface 691 is at a position facing the contact part 664. In this state, the arm 66 is positioned at the first position by being pulled by the corresponding spring 67. Note that, in this state, the first cam surface 691 may be in contact with the contact part 664 of the arm 66. In this case, the first cam surface 691 functions as a surface for guiding the arm 66 to the first position.

The second cam surface 692 is a surface for guiding the corresponding arm 66 to the second position. The second cam surface 692 contacts the contact part 664 to press the arm 66 upward in a state where the second cam surface 692 is at a position facing the contact part 664 of the arm 66. In this state, the arm 66 is positioned at the second position by being pressed upward by the second cam surface 692 against the urging force of the spring 67.

<Link Mechanism>

Figure 6:
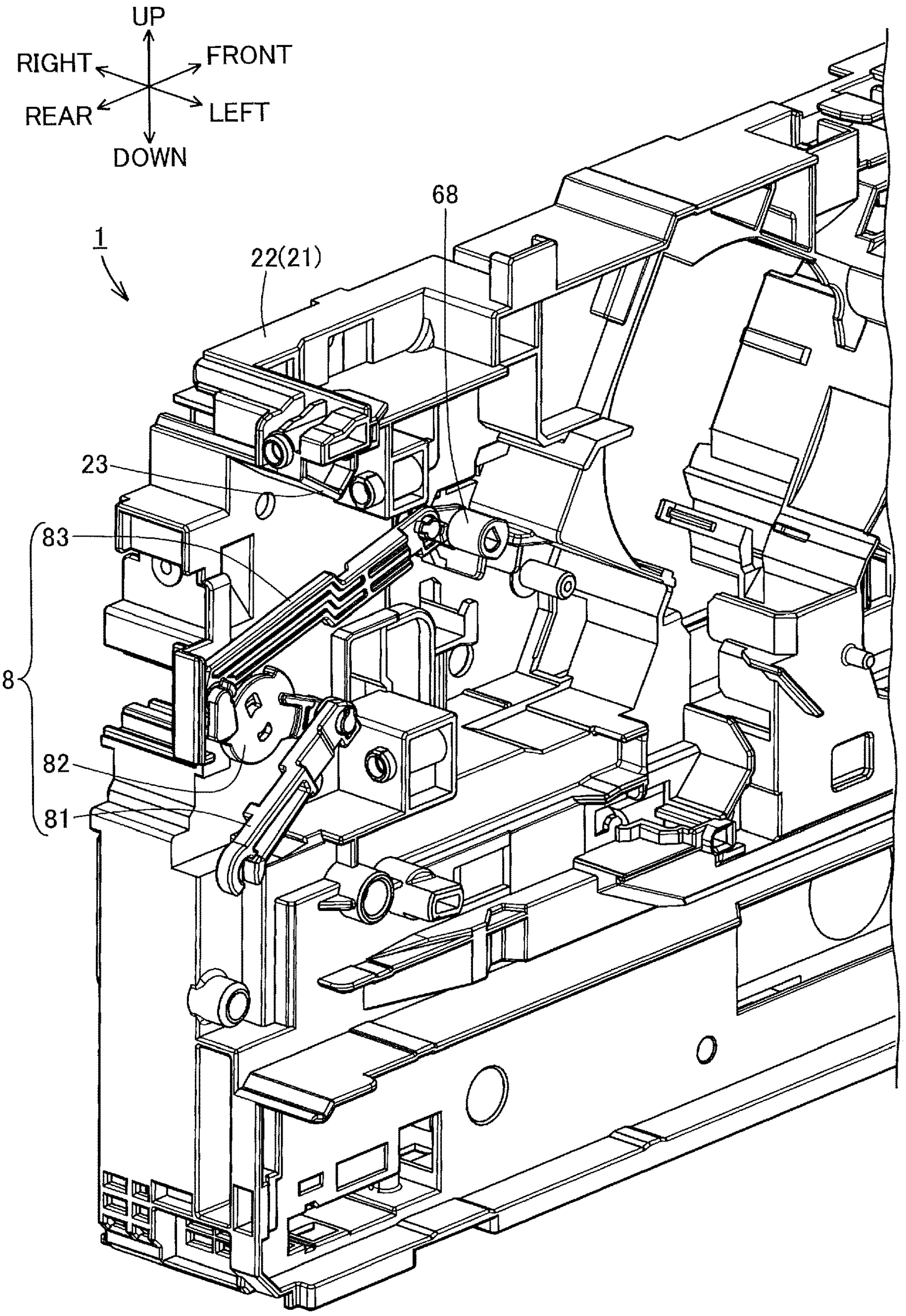
FIG. 6 is a perspective view of a link mechanism and a right frame.
Figure 7:
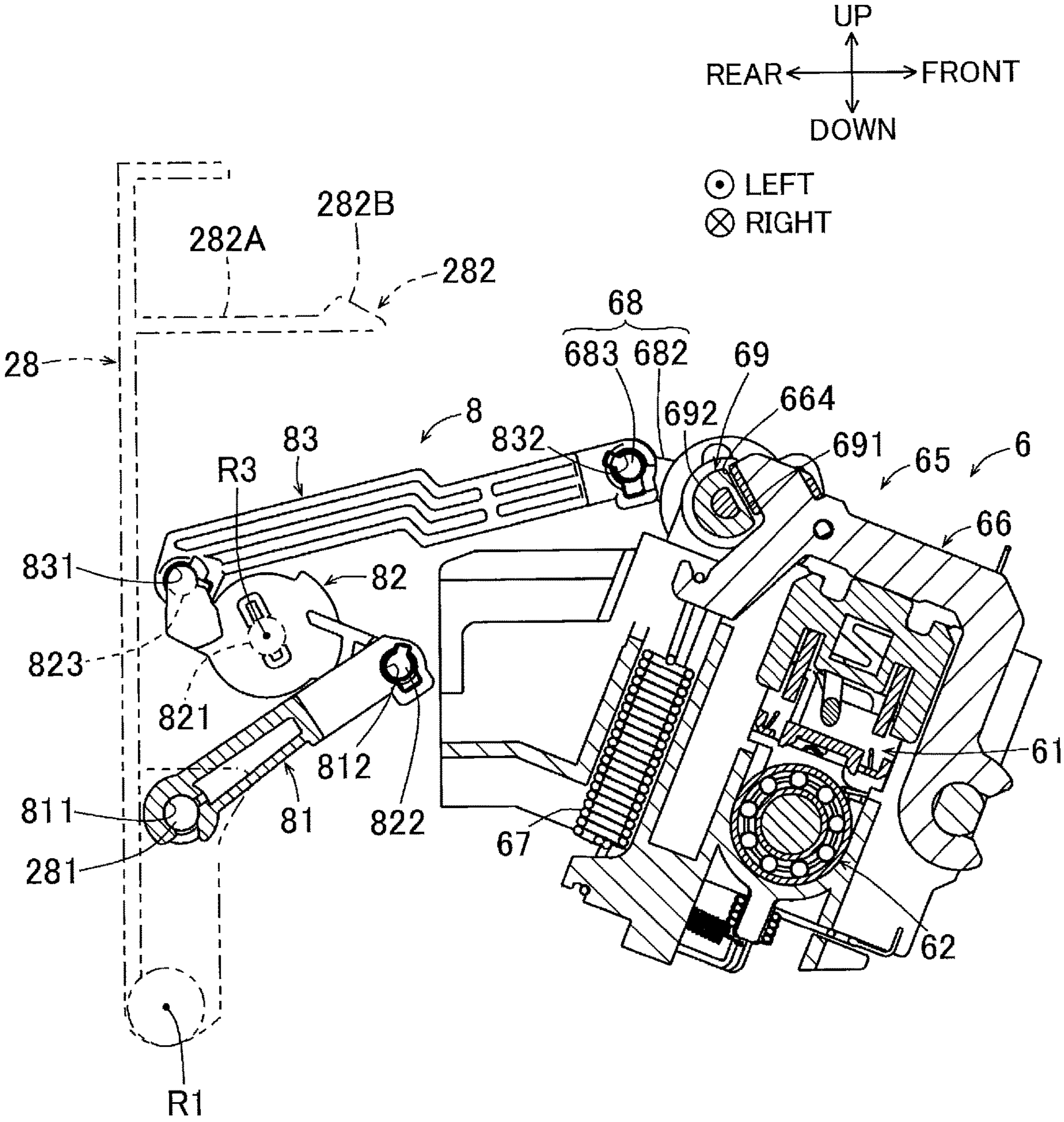
FIG. 7 is a side cross-sectional view of the link mechanism and the fixing device, and particularly illustrating a state where a rear cover is in its closed position.
Figure 8:
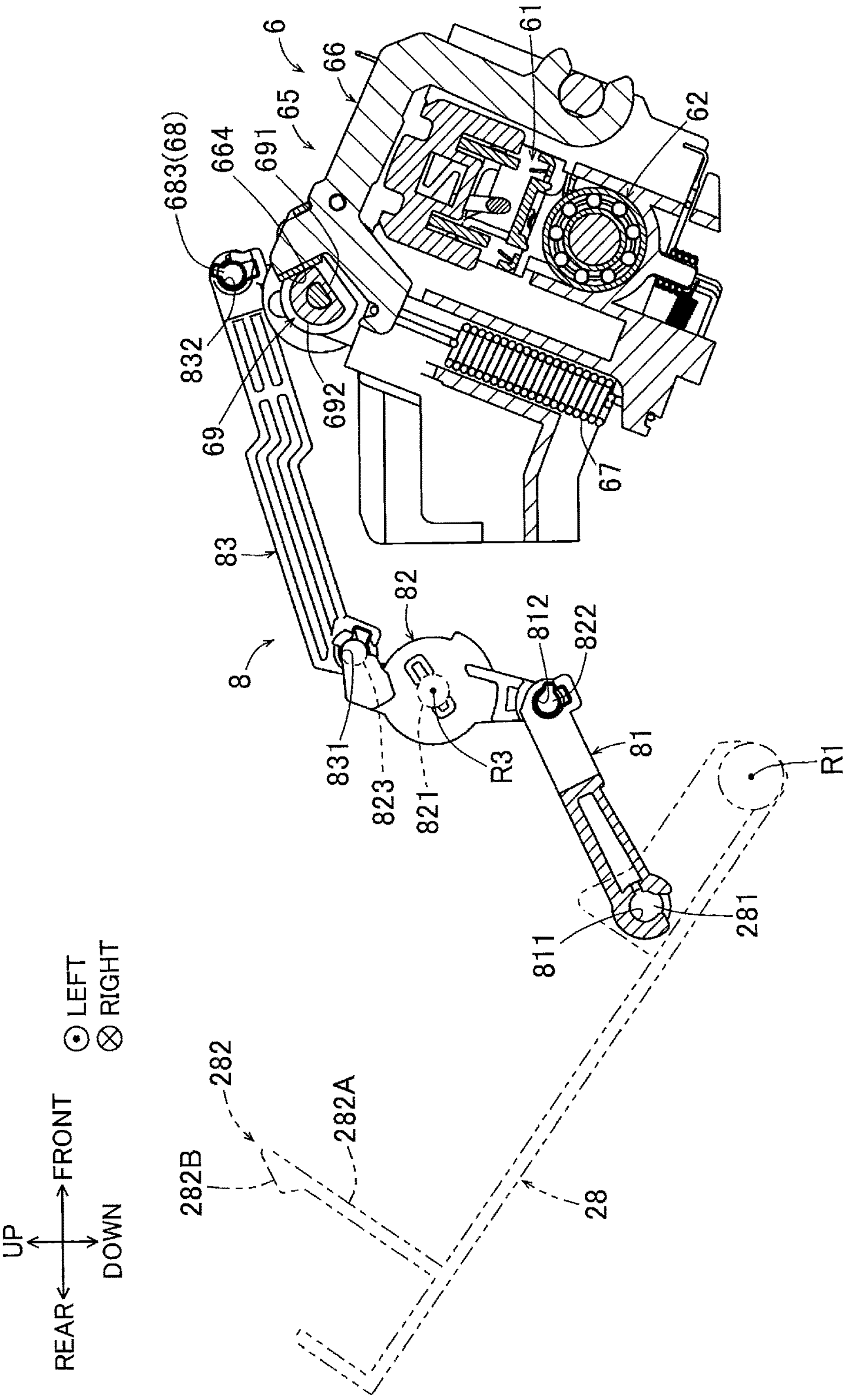
FIG. 8 is a side cross-sectional view of the link mechanism and the fixing device, and particularly illustrating a state where the rear cover is in its open position.

As illustrated in FIGS. 6 through 8, the image forming apparatus 1 further includes a link mechanism 8. The link mechanism 8 connects the adjustment mechanism 65 and the rear cover 28 to each other such that the adjustment mechanism 65 works in conjunction with opening and closing of the rear cover 28. The link mechanism 8 is positioned at the rear portion of the left surface of the right frame 22. The link mechanism 8 includes a first link 81, a second link 82, and a third link 83.

The first link 81 is a generally linear-shaped member connected to the rear cover 28. The first link 81 has one end portion including an outer-fitting part 811 and the other end portion formed with a hole 812. The outer-fitting part 811 is fitted around a boss 281 of the rear cover 28 so as to be pivotally movable about the boss 281. The boss 281 of the rear cover 28 is provided above the pivot axis R1.

The second link 82 is a generally disc-shaped member connected to the first link 81. The second link 82 includes a boss 821, a boss 822, and a boss 823. The boss 821 protrudes rightward and is supported by the right frame 22 so as to be pivotally movable about a pivot axis R3 extending in the left-right direction. The pivot axis R3 is an example of the first axis. The boss 822 protrudes leftward and is fitted in the hole 812 of the first link 81 so as to be pivotally movable. The boss 823 protrudes rightward. In the present embodiment, the boss 821, the boss 822, and the boss 823 fall along a generally straight line.

The third link 83 is a generally linear-shaped member connected to both the second link 82 and the adjustment mechanism 65. The third link 83 has one end portion formed with a hole 831 and the other end portion formed with a hole 832. The boss 823 of the second link 82 is fitted in the boss 823 of the second link 82 so as to be pivotally movable. The boss 683 of the fourth link 68 is fitted in the hole 832 so as to be pivotally movable. In the present embodiment, the third link 83 has a length greater than the length of the first link 81.

In a state where the rear cover 28 is in the closed position as illustrated in FIG. 7, the link mechanism 8 is folded in the front-rear direction to have an inverted Z-shape. In this state, in the adjustment mechanism 65, the first cam surface 691 of each of the cams 69 is in a position facing the corresponding contact part 664. Hence, each of the arms 66 is pulled by the corresponding spring 67 to be positioned at the first position, so that the heating unit 61 is pressed toward the pressure roller 62 to form the nipping region NP. Accordingly, in this state, the image forming apparatus 1 is ready to perform thermally fixing the toner image to the sheet S, i.e., perform printing on the sheet S.

Further, in a state where the rear cover 28 is in the closed position, the joint portion in which the first link 81 and the second link 82 are connected to each other (an example of the first joint portion) is positioned further frontward than the pivot axis R3 in the front-rear direction, while the joint portion in which the second link 82 and the third link 83 are connected to each other (an example of the second joint portion) is positioned further rearward than the pivot axis R3 in the front-rear direction. With this structure, the amount of pivotal movement of the second link 82 along with opening and closing of the rear cover 28 can be increased, whereby the amount of movement of the third link 83 in the front-rear direction can be increased.

When the rear cover 28 is moved from the closed position to the open position, the rear cover 28 pulls and moves the first link 81 rearward, so that the first link 81 pulls the second link 82 to pivotally move the second link 82 clockwise in a left-side view. This pivotal movement of the second link 82 presses and moves the third link 83 frontward to cause the third link 83 to press the fourth link 68, thereby pivotally moving the fourth link 68 clockwise in a left-side view. In accordance with this pivotal movement of the fourth link 68, the cams 69 are pivotally moved clockwise in a left-side view, and accordingly, the second cam surface 692 of each of the cams 69 contacts the corresponding contact part 664 to press the corresponding arm 66 upward to the second position.

As a result, in a state where the rear cover 28 is in the open position as illustrated in FIG. 8, the link mechanism 8 extends along the front-rear direction and the arms 66 of the adjustment mechanism 65 are in their second position. Hence, the pressure applied to the pressure roller 62 by the heating unit 61 is released, and thus, the nipping pressure between the pressure roller 62 and the heating unit 61 is lower than that when the arms 66 are in their first position (i.e., when the rear cover 28 is in the closed position). Accordingly, the jam process of the sheet S can be performed in this state. A detailed description of operations of the above components when the rear cover 28 is moved from the open position to the closed position will be omitted because each component works simply in reverse to the above-described operation.

With the link mechanism 8 and the adjustment mechanism 65 as constructed above, in conjunction with opening and closing of the rear cover 28, the fixing device 6 is switchable between a state of being ready for printing and a state of being ready for the jam process. Further, according to the link mechanism 8, the amount of pivotal movement of the second link 82 is converted into the amount of movement of the third link 83 in the front-rear direction since the second link 82 is a pivot link. Hence, the amount of movement of the link mechanism 8 in the up-down direction can be decreased. This configuration allows the image forming apparatus 1 to be made more compact in the dimension in the up-down direction. Furthermore, the rear cover 28 and the fixing device 6 are positioned together in the rear end portion of the image forming apparatus 1, whereby the link mechanism 8 positioned between the rear cover 28 and the fixing device 6 can be made more compact.

<Locking Parts>

Figure 9:
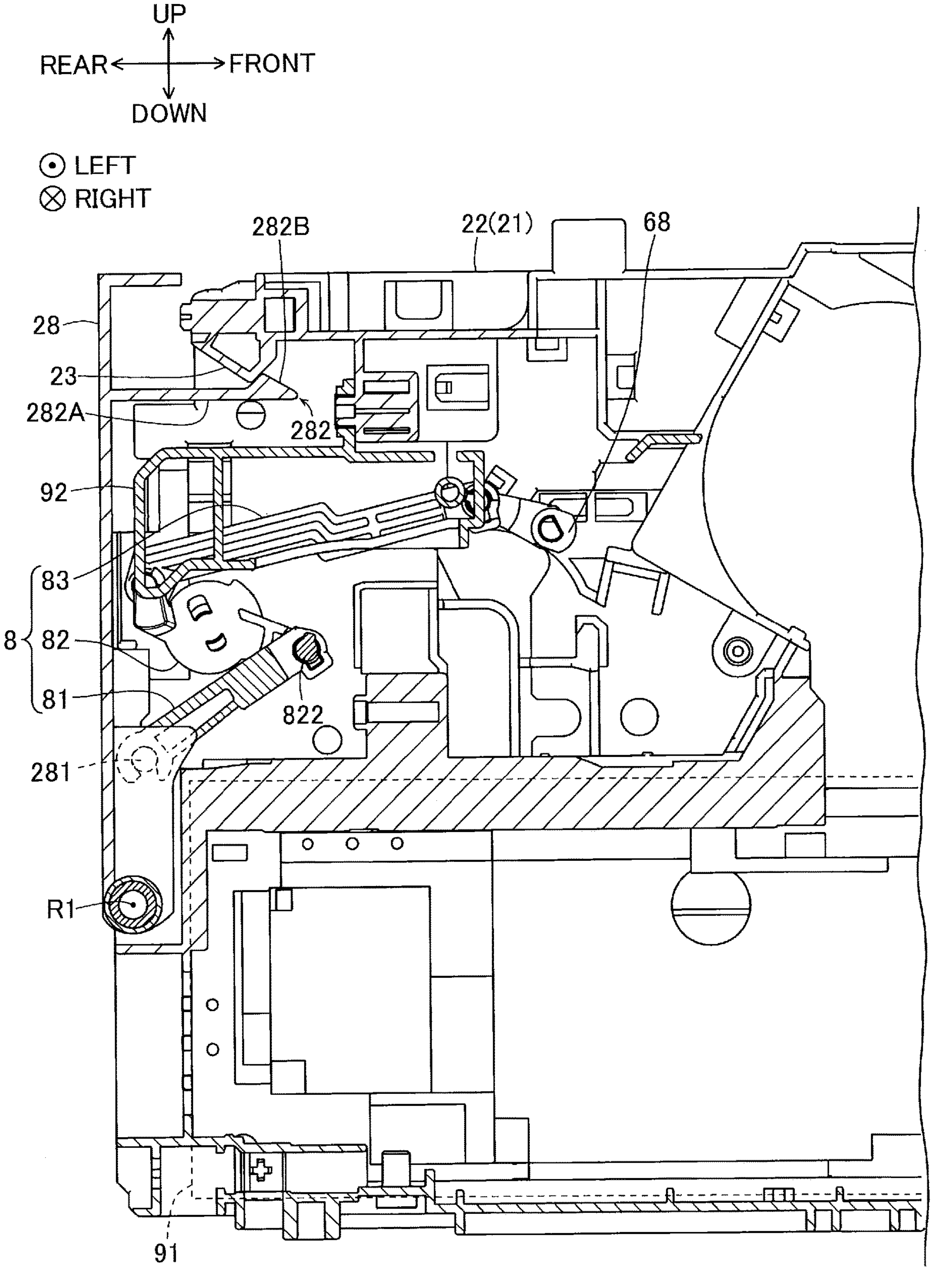
FIG. 9 is a side cross-sectional view of the rear cover, an inner chute, the link mechanism, and the right frame.

As illustrated in FIG. 9, the rear cover 28 includes a pair of locking parts 282 (left and right locking parts 282) configured to engage with the frame 21 when the rear cover 28 is in the closed position and to restrict the rear cover 28 from moving from the closed position to the open position. The left and right locking parts 282 have the same shape and are provided at the left and right end portions of the rear cover 28, respectively. The right frame 22 of the frame 21 includes an engagement portion 23 configured to engage with the right locking part 282, while the left frame of the frame 21 includes another engagement portion 23 (not illustrated) configured to engage with the left locking part 282. Each locking part 282 is brought into engagement with the corresponding engagement portion 23 when the rear cover 28 is moved from the open position to the closed position.

As illustrated in FIG. 9, each of the locking parts 282 includes a plate-shaped part 282A, and an engagement protrusion 282B. The plate-shaped part 282A is a plate-shaped member extending from the inner surface of the rear cover 28. Specifically, the plate-shaped part 282A extends frontward from the vicinity of the upper end of the inner surface of the rear cover 28 when the rear cover 28 is in the closed position. The engagement protrusion 282B is a protrusion having a triangular cross section and protruding from the plate-shaped part 282A. When the rear cover 28 is in the closed position, the engagement protrusion 282B protrudes upward from the front end portion of the plate-shaped part 282A. The engagement protrusion 282B is configured to engage with the corresponding engagement portion 23.

Each of the engagement portions 23 is a member protruding downward to have a triangular cross section. The lower portion of each of the engagement portions 23 is configured to engage with the corresponding engagement protrusion 282B. In a process in which the rear cover 28 is moved from the open position to the closed position, each of the engagement protrusions 282B contacts the corresponding engagement portion 23 and warps upon arrival of the rear cover 28 near the closed position. Then, when the rear cover 28 has reached the closed position, each of the engagement protrusions 282B completely engages with the corresponding engagement portion 23 and the rear cover 28 is thus locked.

As illustrated in FIGS. 7 through 9, the above-described components and parts are disposed such that, in the process of movement of the rear cover 28 from the closed position to the open position, the second cam surface 692 of each of the cams 69 contacts the corresponding contact part 664 in the adjustment mechanism 65 after each of the engagement protrusions 282B becomes disengaged from the corresponding engagement portion 23. This configuration can be implemented by designing the shapes of the locking parts 282, the engagement portions 23 and the cams 69, the distance between the first cam surface 691 and the contact part 664, and other components as appropriate.

With the above configuration, the load occurring due to engagements of the locking parts 282 with the corresponding engagement portions 23 and the load occurring due to the second cam surfaces 692 pressing the corresponding arms 66 upward are not simultaneously applied to the rear cover 28 during opening and closing of the rear cover 28. Accordingly, the force required to operate the rear cover 28 is reduced, thereby improving the operability of the rear cover 28. Note that the locking parts 282 and the rear cover 28 may be formed as a single member. Alternatively, the locking parts 282 may be separate members from the rear cover 28 and may be attached to the inner surface of the rear cover 28. The plate-shaped parts 282A of the locking parts 282 and the rear cover 28 may be formed as a single member, and the engagement protrusions 282B may be separate members from both the plate-shaped parts 282A and the rear cover 28 and may be attached to the distal end portion of the corresponding plate-shaped parts 282A.

<Circuit Board>

Figure 10:
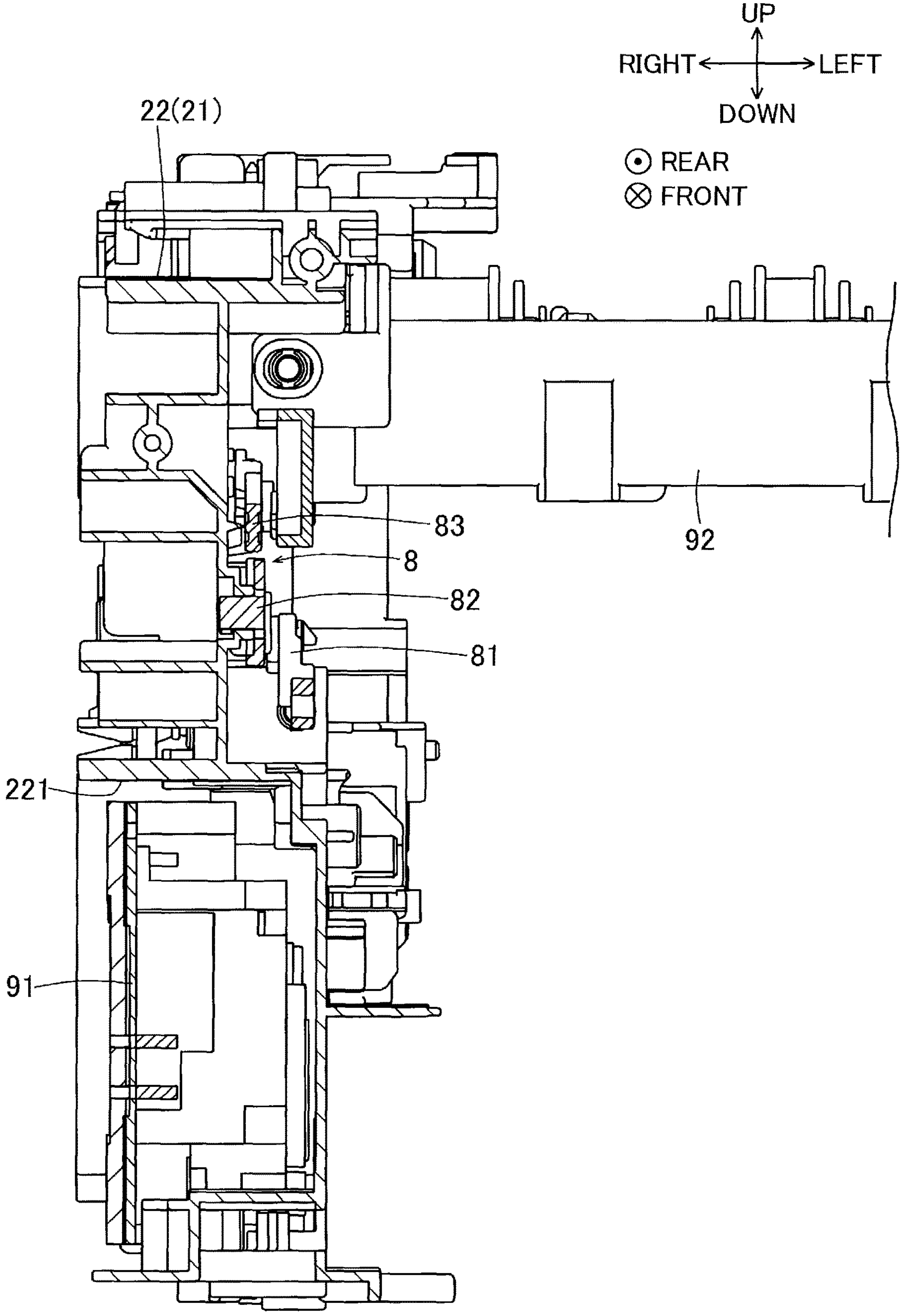
FIG. 10 is a rear cross-sectional view of a circuit board, the inner chute, the link mechanism, and the right frame.

As illustrated in FIGS. 9 and 10, the image forming apparatus 1 further includes a circuit board 91 that controls the motor 4 and other parts. The circuit board 91 is accommodated in a circuit board accommodating section 221 provided at the lower portion of the right surface of the right frame 22. The circuit board 91 is a substantially rectangular shaped substrate on which electronic components are mounted. The circuit board 91 is disposed such that the long side of the circuit board 91 is oriented along the front-rear direction, the short side is oriented along the up-down direction, and the width of the circuit board 91 in the left-right direction fits within the circuit board accommodating section 221. The rear end of the circuit board 91 is positioned near the pivot axis R1 while the front end of the circuit board 91 is positioned further frontward than the front-rear center of the right frame 22 in the front-rear direction.

In a state where the rear cover 28 is in the closed position, the link mechanism 8 is positioned further upward than the circuit board 91, and is positioned so as to overlap the circuit board 91 both in the front-rear direction and in the left-right direction. More specifically, nearly the entire link mechanism 8 overlaps the circuit board 91 in the front-rear direction, and the entire link mechanism 8 overlaps the circuit board 91 in the left-right direction. As a result, the link mechanism 8 can be disposed avoiding the circuit board 91 while achieving space conservation.

As illustrated in FIGS. 7 through 9, both in a state where the rear cover 28 is in the closed position and in a state where the rear cover 28 is in the open position, the third link 83 is positioned further upward than the lower end of the second link 82. Hence, the third link 83 does not interfere with the circuit board 91 during opening and closing of the rear cover 28. In other words, the third link 83 can be disposed while avoiding the circuit board 91.

<Inner Chute>

Figure 11:
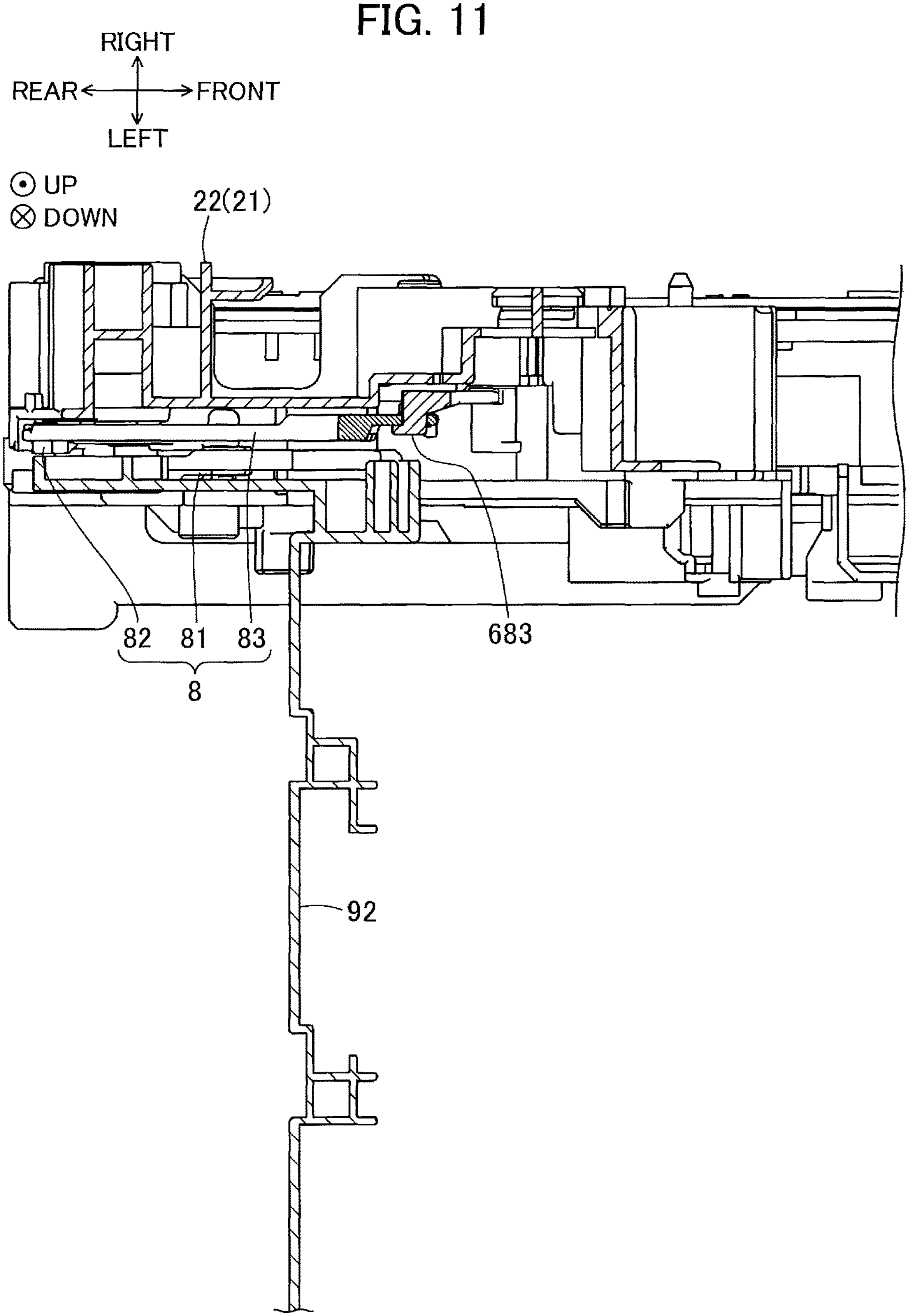
FIG. 11 is a plan cross-sectional view of the inner chute, the link mechanism, and the right frame.

As illustrated in FIGS. 9 through 11, the image forming apparatus 1 further includes an inner chute 92 supporting the lower discharge roller of the pair of discharge rollers 71. The inner chute 92 constitutes part of the conveying passage P. As illustrated in FIG. 9, the inner chute 92 is disposed near the rear cover 28 in the front-rear direction, between the first link 81 and the locking parts 282 in the up-down direction, and between the right frame 22 and the left frame in the left-right direction.

As illustrated in FIGS. 10 and 11, of the link mechanism 8, the second link 82 and the third link 83 are positioned between the inner chute 92 and the right frame 22 positioned outward of the inner chute 92 in the left-right direction. In other words, a space is formed between the inner chute 92 and the right frame 22, and the second link 82 and the third link 83 are disposed in that space.

With the above structure, the positions of the second link 82 and the third link 83 in the left-right direction can be regulated by the inner chute 92 and the right frame 22, and in addition to this, the second link 82 and the third link 83 can be disposed in positions in which the second link 82 and the third link 83 are difficult for a user to touch. Note that, the first link 81 of the link mechanism 8 is disposed in a position overlapping the inner chute 92 in the left-right direction.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The structure in the image forming apparatus 1 may be reversed in the front-rear direction. In this case, the rear cover 28 is provided as the front cover and the fixing device 6 and the link mechanism 8 are disposed further frontward than the front-rear center of the frame 21 in the front-rear direction.

In the above embodiment, a film heating system using the belt 614 has been described as an illustrative example of the heating unit 61, but any other system can be employed as the heating unit 61. For example, a roller heating method using a heating roller may be employed as the heating unit 61. In this case, the heating unit 61 is constituted by a heater, a heating roller heated by the heater, and other components, and the heating roller and the pressure roller 62 form the nipping region NP for applying heat and pressure to the sheet S.

Figure 12:
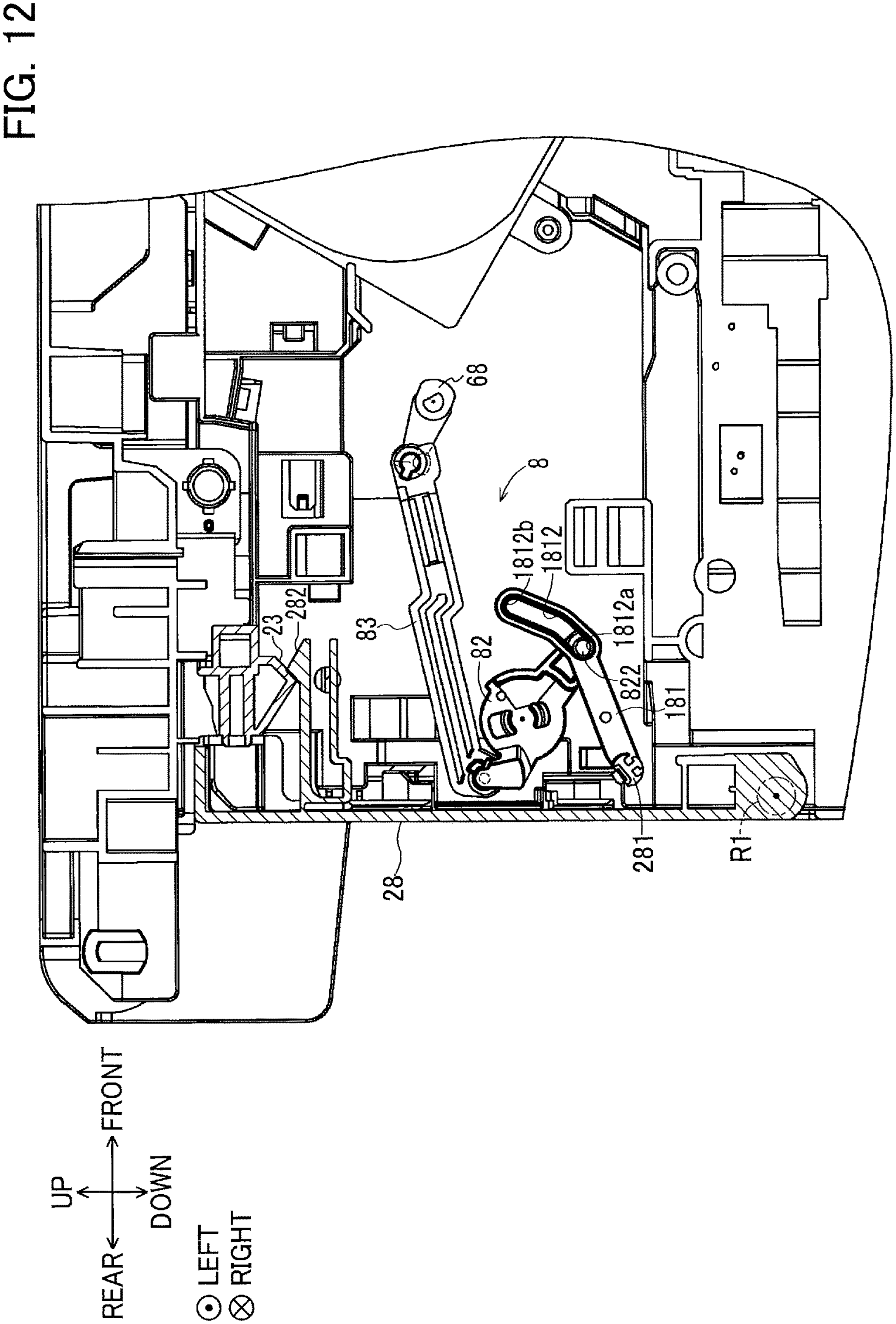
FIG. 12 is a side cross-sectional view of the rear cover, a link mechanism, and the right frame, and particularly illustrating a state where the rear cover is in the closed position.
Figure 13:
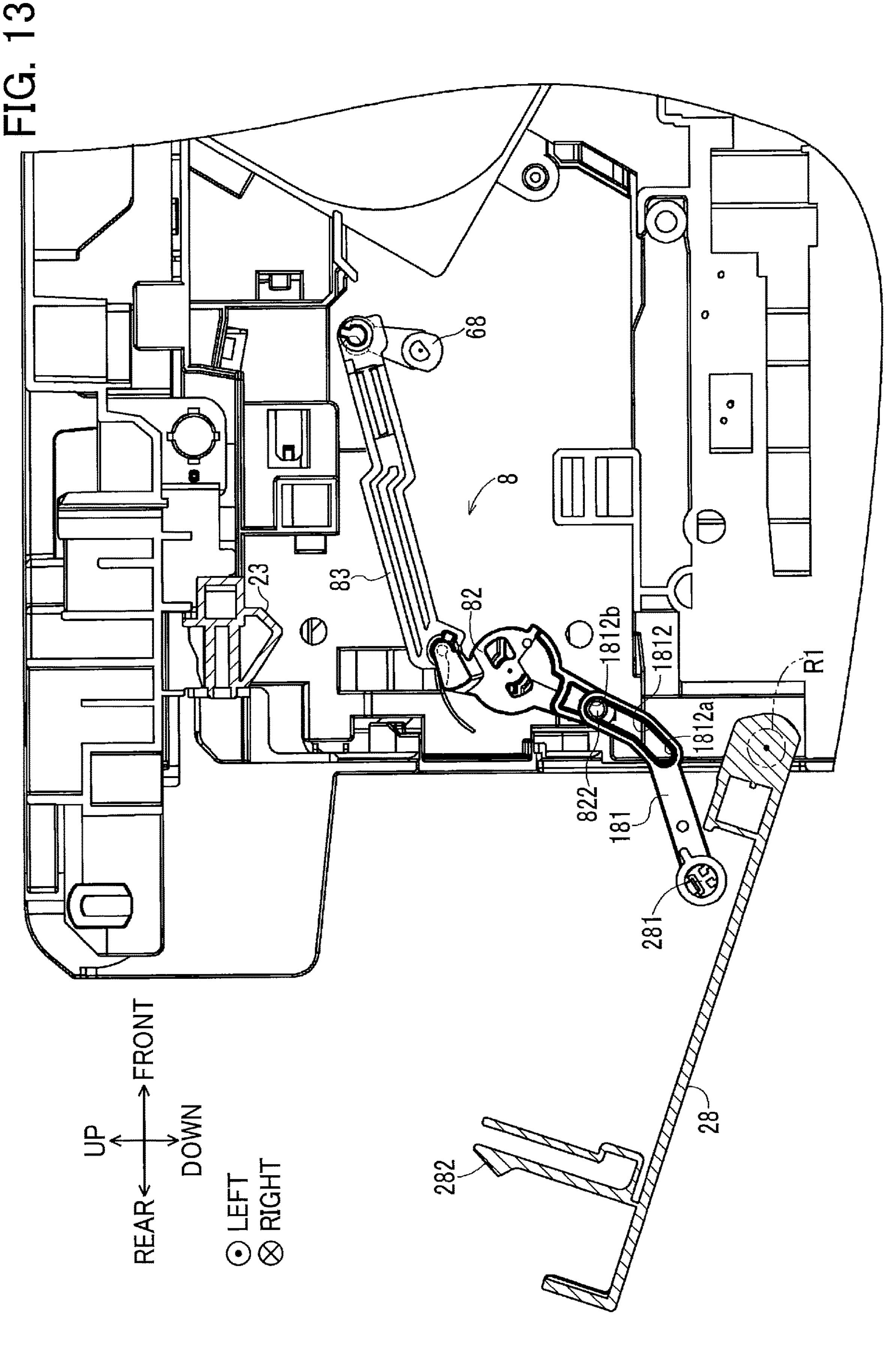
FIG. 13 is a side cross-sectional view of the rear cover, the link mechanism, and the right frame, and particularly illustrating a state where the rear cover is in the open position.

The hole 812 of the first link 81 may have a shape other than that in the above-described embodiment. FIGS. 12 and 13 illustrate a modification in which a first link 181 has an elongated hole 1812 instead of the hole 812.

As illustrated in FIG. 12, in a state where the rear cover 28 is in the closed position, the boss 822 of the second link 82 is positioned at one end portion **1812*a* of the elongated hole 1812. During movement of the rear cover 28 from the closed position toward the open position, the boss 182 is relatively moved inside the elongated hole 1812 from the one end portion 1812*a* toward another end portion 1812*b*. In a state where the rear cover 28 is in the open position, the boss 822 is positioned at the other end portion 1812*b* of the elongated hole 1812**.

When the rear cover 28 is moved from the closed position to the open position (i.e., when the boss 822 of the second link 82 is relatively moved inside the elongated hole 1812 toward the other end portion **1812*b*), the first link 181 moves but the second link 82 and the third link 83 do not move while the arms 66** are left in their first position.

As the rear cover 28 is further moved toward the open position while the boss 822 abuts on the other end portion **1812*b* of the elongated hole 1812, the second link 82 is pivotally moved in accordance with the movement of the first link 181, and the third link 82 is also moved frontward in accordance with the pivotal movement of the second link 82. As a result, the arms 66** are moved to their first position to the second position, whereby the jam process to remove the sheet S that has been jammed can be performed.

With the above configuration in this modification, the operation required to open the rear cover 28 and the operation required to move the arms 66 from the first position to the second position can be separate operations that are distinguishable from each other.

On the other hand, when the rear cover 28 is moved from the open position to the closed position, the first link 181 moves frontward, and the boss 822 is relatively moved from the other end portion **1812*b* toward the one end portion 1812*a* inside the elongated hole 1812 to reach the one end portion 1812*a*. As the rear cover 28 is further moved toward the closed position, the one end portion 1812*a* of the elongated hole 1812 contacts the boss 822 of the second link 82 to pivotally move the second link 82, and to move the third link 83 in accordance with the pivotal movement of the second link 82. Accordingly, the arms 66 are moved back from the second position to the first position, and the image forming apparatus 1** is ready to perform thermally fixing the toner image to the sheet S, i.e., perform printing on the sheet S.

In this process of movement of the rear cover 28 from the open position to the closed position, the arms 66 are moved to the first position by the urging force of the springs 67 and movement of the arms 66 to the first position is completed before the rear cover 28 arrives near the closed position. By this movement of the arms 66 due to the urging force of the springs 67, the contact between the boss 822 of the second link 82 and the elongated hole 1812 is released. In this released state, the rear cover 28 can move from the vicinity of the closed position to the closed position independently of the arm 66, the second link 82, and the third link 83. Therefore, the user can move the rear cover 28 to the closed position with a light force.

Further, even if the links have variation in their dimensions or the joint portions between the links have looseness, the elongated hole 1812 can absorb them, thereby avoiding the occurrence of a situation where the rear cover 28 cannot completely be closed.

What is claimed is:

1. An image forming apparatus comprising:

a frame having one end portion in a front-rear direction, the frame being formed with an opening at the one end portion;

a cover configured to be pivotally movable between:

a closed position in which the cover covers the opening; and an open position in which the cover opens the opening to an outside;

a fixing unit configured to thermally fix an image to a sheet, the fixing unit comprising:

a heating member positioned closer to the one end portion than a center in the front-rear direction of the frame is to the one end portion, the heating member being configured to heat the sheet having an image formed thereon; and a pressure roller configured to form a nipping region in cooperation with the heating member;

an adjustment mechanism configured to adjust a nipping pressure between the heating member and the pressure roller in conjunction with movement of the cover between the closed position and the open position, the adjustment mechanism comprising an arm pressing the heating member such that the heating member and the pressure roller form the nipping region therebetween, the arm being positioned at a first position when the cover is in the closed position, the arm being positioned at a second position when the cover is in the open position, the arm in the second position causing the nipping pressure to be reduced to a pressure lower than the nipping pressure when the arm is in the first position; and a link mechanism connected to both the adjustment mechanism and the cover, the link mechanism comprising:

a first link connected to the cover;

a second link connected to the first link and supported by the frame so as to be pivotally movable about a first axis extending in a width direction orthogonal to the front-rear direction; and a third link connected to both the second link and the adjustment mechanism, the third link being movable in the front-rear direction, wherein the frame further has another end portion in the front-rear direction that is opposite the one end portion, wherein the first link and the second link are connected to each other at a first joint portion while the second link and the third link are connected to each other at a second joint portion, and wherein in a state where the cover is in the closed position, the first joint portion is positioned closer to the another end portion than the first axis is to the another end portion in the front-rear direction, and the second joint portion is positioned closer to the one end portion than the first axis is to the one end portion in the front-rear direction.

2. The image forming apparatus according to claim 1, wherein the adjustment mechanism further comprises:

an urging member urging the arm in a direction from the second position toward the first position;

a fourth link connected to the third link and pivotally movable about a second axis extending in the width direction; and a cam fixed to the fourth link and pivotally movable about the second axis, the cam being configured to guide the arm to the second position.

3. The image forming apparatus according to claim 2, wherein the urging member is a spring.

4. The image forming apparatus according to claim 2, wherein the cover comprises an engagement protrusion, the engagement protrusion engaging with the frame in a state where the cover is in the closed position to restrict movement of the cover from the closed position to the open position, wherein the cam has:

a first cam surface facing the arm in the first position with a gap between the first cam surface and the arm in a state where the cover is in the closed position; and a second cam surface configured to contact the arm to guide the arm to the second position, and wherein in a process of the movement of the cover from the closed position to the open position, the second cam surface contacts the arm after the engagement protrusion becomes disengaged from the frame.

5. The image forming apparatus according to claim 4, wherein the first cam surface is a flat surface, and wherein the second cam surface is an arcuate surface continuous with the first cam surface.

6. The image forming apparatus according to claim 4, wherein the cover further comprises a plate-shaped part extending from an inner surface of the cover and having a distal end portion, the plate-shaped part extending in the front-rear direction in a state where the cover is in the closed position, and wherein the engagement protrusion protrudes upward from the distal end portion of the plate-shaped part and engages with the frame in a state where the cover is in the closed position.

7. The image forming apparatus according to claim 1, further comprising a circuit board, wherein the link mechanism is positioned further upward than the circuit board in a gravitational direction and is positioned so as to overlap the circuit board both in the front-rear direction and in the width direction in a state where the cover is in the closed position.

8. The image forming apparatus according to claim 7, wherein the third link is positioned further upward than a lower end of the second link in the gravitational direction both in a state where the cover is in the closed position and in a state where the cover is in the open position.

9. The image forming apparatus according to claim 1, further comprising:

a discharge roller configured to discharge a sheet out of the image forming apparatus; and an inner chute supporting the discharge roller, wherein the second link and the third link are positioned between the inner chute and a portion of the frame in the width direction, the portion of the frame being positioned further outward than the inner chute in the width direction.

10. An image forming apparatus comprising:

a frame having one end portion in a front-rear direction, the frame being formed with an opening at the one end portion;

a cover configured to be pivotally movable between:

a closed position in which the cover covers the opening; and an open position in which the cover opens the opening to an outside;

a fixing unit configured to thermally fix an image to a sheet, the fixing unit comprising:

a heating member positioned closer to the one end portion than a center in the front-rear direction of the frame is to the one end portion, the heating member being configured to heat the sheet having an image formed thereon; and a pressure roller configured to form a nipping region in cooperation with the heating member;

an adjustment mechanism configured to adjust a nipping pressure between the heating member and the pressure roller in conjunction with movement of the cover between the closed position and the open position, the adjustment mechanism comprising an arm pressing the heating member such that the heating member and the pressure roller form the nipping region therebetween, the arm being positioned at a first position when the cover is in the closed position, the arm being positioned at a second position when the cover is in the open position, the arm in the second position causing the nipping pressure to be reduced to a pressure lower than the nipping pressure when the arm is in the first position; and a link mechanism connected to both the adjustment mechanism and the cover, the link mechanism comprising:

a first link connected to the cover;

a second link connected to the first link and supported by the frame so as to be pivotally movable about a first axis extending in a width direction orthogonal to the front-rear direction, a position of the first axis being not changed during pivotal movement of the second link; and a third link connected to both the second link and the adjustment mechanism, the third link and the second link being connected to each other both in a state where the cover is in the closed position and in a state where the cover is in the open position, the third link being movable in the front-rear direction.

* * * * *